United States Patent [19]
Schoonderwoerd et al.

[11] Patent Number: 6,057,001
[45] Date of Patent: May 2, 2000

[54] COATING COMPOSITION HAVING IMPROVED ADHESION TO SUBSTRATE

[75] Inventors: Nicolaas Antonius Maria Schoonderwoerd, Stompwijk, Netherlands; Paul Marie Vandevoorde, Essen, Belgium

[73] Assignee: AD Aerospace Finishes V.O.F., Sassenheim, Netherlands

[21] Appl. No.: 08/973,036

[22] PCT Filed: May 24, 1996

[86] PCT No.: PCT/EP96/02276

§ 371 Date: Mar. 2, 1998

§ 102(e) Date: Mar. 2, 1998

[87] PCT Pub. No.: WO96/37563

PCT Pub. Date: Nov. 28, 1996

[30] Foreign Application Priority Data

May 26, 1995 [EP] European Pat. Off. .............. 95201388

[51] Int. Cl.[7] ........................................ B05D 3/02
[52] U.S. Cl. ....................... 427/385.5; 427/372.2
[58] Field of Search ................ 524/417; 427/372.2, 427/385.5

[56] References Cited

U.S. PATENT DOCUMENTS

| | | | |
|---|---|---|---|
| 3,668,183 | 6/1972 | Hoy et al. | 260/65 |
| 3,975,251 | 8/1976 | McGinniss | 204/181 |
| 4,217,396 | 8/1980 | Heckles | 528/306 |
| 4,251,597 | 2/1981 | Emmons et al. | 428/500 |
| 4,503,174 | 3/1985 | Vasta | 523/439 |
| 4,504,630 | 3/1985 | Buchwalter | 525/296 |
| 5,021,537 | 6/1991 | Stark et al. | 528/106 |
| 5,214,086 | 5/1993 | Mormile et al. | 524/237 |
| 5,288,802 | 2/1994 | Walters et al. | 525/110 |
| 5,288,804 | 2/1994 | Kim | 525/447 |
| 5,288,820 | 2/1994 | Rector | 525/510 |
| 5,426,148 | 6/1995 | Tucker | 524/592 |
| 5,451,653 | 9/1995 | Chen | 524/555 |
| 5,536,784 | 7/1996 | Mao | 525/157 |
| 5,567,761 | 10/1996 | Song | 524/523 |

FOREIGN PATENT DOCUMENTS

| | | | |
|---|---|---|---|
| 139 513 | 5/1985 | European Pat. Off. | C09D 3/72 |
| 199 087 | 10/1986 | European Pat. Off. | C08F 8/32 |
| 227 454 | 7/1987 | European Pat. Off. | C08F 8/00 |
| 240 083 | 10/1987 | European Pat. Off. | C07C 119/12 |
| 417 824 | 3/1991 | European Pat. Off. | C08G 18/83 |
| 483 583 | 5/1992 | European Pat. Off. | C08K 5/54 |
| 483 915 | 5/1992 | European Pat. Off. | C09D 133/06 |
| 2 075 995 | 11/1981 | United Kingdom | C08G 16/00 |
| 2 213 157 | 9/1989 | United Kingdom | C08F 20/26 |
| WO 94/21738 | 9/1994 | WIPO | C09D 201/06 |
| WO 95/09208 | 4/1995 | WIPO | C09D 133/08 |

OTHER PUBLICATIONS

Form PCT/IPEA/408 Written Opinion of Intl. App. PCT/EP96/02276 (5 sheets).

International Search Report for App. PCT/EP96/02275 dated Sep. 16, 1996.

International Search Report for App. PCT/EP96/02276 dated Sep. 25, 1996.

Clemens, et al., "The Acetoacetyl Functionality: A New Approach to Thermoset Coatings," *XVIth International Conference in Organic Coatings Science and Technology*, p. 127 (Jul. 1990).

Carder, et al., "Polyenamine Coatings, II. Chemical Methods of Improving Film Properties", *Journal of Paint Technology*, vol. 46, No. 591, pp. 76–81 (Apr. 1974).

Hoy, et al., "Polyenamine Coatings, I. Formulation of Coatings and Determination of Film Properties", *Journal of Paint Technology*, vol. 46, No. 591, pp. 70–75 (Apr. 1974).

Solomon, "The Chemistry of Organic Film Formers", Robert E. Krieger Publishing Company, Huntington, N.Y., p. 103 (1977).

Witzeman, et al., "Comparison of Methods for the Preparation of Acetoacetylated Coating Resins", *Journal of Coatings Technology*, vol. 62, No. 789, pp. 101–112 (Oct. 1990).

Patton, "Pigment Handbook", Ed. Wiley–Interscience, New York, 1973).

*Primary Examiner*—Paul R. Michl
*Attorney, Agent, or Firm*—Joan M. McGillycuddy

[57] ABSTRACT

The invention pertains to a coating composition comprising a polyacetoacetate and a crosslinker for said polyacetoacetate wherein the crosslinker is present in an amount insufficient to crosslink all acetoacetate groups and the polyacetoacetate has a number average molecular weight less than 1000. The coating composition may also comprise an organosilane. The organosilane preferably comprises at least one amino group, amino-containing group, epoxy group, epoxy-containing group, mercapto group, mercapto-containing group, vinyl group, vinyl-containing group, isocyanate group, isocyanate-containing group, ureido group, ureido-containing group, imidazole group or imidazole-containing group. The coating composition is particularly useful as a primer for an aluminium substrate.

2 Claims, No Drawings

COATING COMPOSITION HAVING IMPROVED ADHESION TO SUBSTRATE

The current invention relates to a coating composition comprising polyacetoacetate and crosslinker for said polyacetoacetate.

BACKGROUND OF THE INVENTION

Coating compositions of this type are generally known from, for example, U.S. Pat. No. 3,668,183, "Polyenamine Coatings: I. Formulation of Coatings and Determination Of Film Properties", K. L. Hoy and C. H. Carder, *Journal of Paint Technology*, Vol. 46, No. 591, April 1974, pages 70–75, and "Polyenamine Coatings: II. Chemical Methods of Improving Film Properties", C. H. Carder and H. O. Colomb, Jr., *Journal of Paint Technology*, Vol. 46, No. 591, April 1974, pages 76–78, referred to respectively as "Polyenamine Coatings I" and "Polyenamine Coatings II". Such coating compositions, when properly formulated and applied to a substrate, form a coating having highly desirable properties, such as hardness, flexibility and toughness. There is, however, a continuing difficulty in that such coatings frequently do not adequately adhere to the substrate on which they are applied.

U.S. Pat. No. 3,668,183 generally discloses the production of polyenamine resins by the reaction of polyacetoacetates with blocked polyamines. Also disclosed there is the possible use of a silicone component in the polyacetoacetate end cap to improve acid resistance.

WO-A-94/21738 discloses a crosslinkable liquid carrier-based coating composition comprising organic polymer(s) having acetoacetyl group functionality, a polyamine compound(s) having at least two acetoacetyl-reactive amino groups per molecule and a non-polymeric monoacetoacetyl compound(s) selected from a specific group of such compounds. The ratio of acetoacetyl groups of the acetoacetyl functional polymer(s) to the number of acetoacetyl-reactive amino groups of the polyamine compound(s) is between 0.5/1 and 2/1. The particularly preferred ratio is at or very near to 1.

In EP-A-199087, a coating composition is disclosed comprising a polyacetoacetate and a blocked polyamine crosslinker. The blocked polyamine and the polyacetoacetate are present in an amount such that the ratio of the number equivalents of primary and secondary amino groups of the polyamine to the number of equivalents of acetoacetate of the polacetoacetate is between ½ and 2. The polyacetoacetate has a number average molecular weight (Mn) of 1000–100,000.

In EP-A-417824 a polyacetoacetate with a molecular weight Mn between 200 and 1000 is disclosed. This polyacetoacetate is used as a crosslinker for amine-functional polymers. EP-A-417824 teaches use of an equimolar ratio of polymer and crosslinking agent.

The current invention provides a coating composition of the above-described type which, when cured, has a highly improved adhesion to the substrate. Other advantages include highly desirable cure-to-pot life ratio and corrosion-resistance properties. Further, it is possible to formulate the current compositions with low volatile organic content. Still further, the coating compositions herein disclosed are especially useful in the production of a multi-layer coating system, in particular for metal substrates, more particularly aluminum substrates, and more particularly, for aluminium for aircraft. In multi-layer coating systems, the coating compositions of the current invention are especially useful as the primer, and particular, primers which are free, or substantially free, of chromate pigment. As used herein, "primer" means any coating layer in direct contact with the substrate, after optional cleaning, conversion coating and/or other pre-treatment of the substrate.

SUMMARY OF THE INVENTION

The coating composition of the instant invention comprises (a) polyacetoacetate having acetoacetate groups and (b) crosslinker for said polyacetoacetate wherein said crosslinker is present in a amount insufficient to crosslink all acetoacetate groups of the polyacetoacetate. Accordingly, generally the ratio of acetoacetate groups to groups capable of crosslinking with acetoacetate groups is >1, preferably about 1.1 to about 2, and most preferably about 1.15 to about 1.5.

In another embodiment the coating composition further comprises an organosilane.

The coating composition of the invention is further characterized in that the organosilane may be of the following general formula

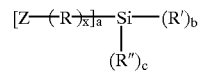

wherein

Z is an amino group, an amino-containing group, an epoxy group, an epoxy-containing group, a mercapto group, a mercapto-containing group, a vinyl group, a vinyl-containing group, an isocyanate group, an isocyanate-containing group, an ureido group, an ureido-containing group, an imidazole group or an imidazole-containing group, R is an aliphatic, alicylic or aromatic group, R' is an alkoxy group or alkoxyalkoxy groups, R" is an alkyl group having 1 to about 8 carbon atoms, x is 0 to about 20, a is 0 to 3, preferably 0 to 2, b is 1 to 4, preferably 1 to 3, c is 0 to 3, and preferably 0 to 2, and the sum of a+b+c is 4.

Preferred organosilanes are aminosilanes, epoxysilanes, mercaptosilanes, vinylsilanes, ureidosilanes, imidazolsilanes and isocyanatosilanes.

DETAILED SUMMARY OF THE INVENTION

Polyacetoacetates are acetoacetate-functional compounds having at least two acetatoacetate groups. Polyacetoacetates are well known in the art, for example as demonstrated in the already mentioned U.S. Pat. Nos. 3,668,183, 5,021,537, "Polyenamine Coatings I" and "Polyenamine Coatings II". They can be described as the partial or complete acetoacetylation product of a monomeric polyalcohol having at least two free hydroxyl groups or an oligomeric or polymeric condensation derivative of such polyalcohols. The production of polyacetoacetates, "acetoacetylation", may be accomplished by various reaction schemes. Some examples are transesterification of alkyl acetoacetates, such as methyl, ethyl or t-butyl acetoacetate with polyols or the reaction of polyol or polythiol with diketene, or the diketene-acetone adduct 2,2,6-trimethyl-1,3-dioxin-4H-one. Such compounds and synthesis mechanisms are well known in the art (see for example U.S. Pat. No. 3,668,183 and "The Acetoacetyl Functionality: A New Approach to Thermoset Coatings", R. J. Clemens, et al., *Proceedings: XVI*[th] *International Conference in Organic Coatings Science and Technology*, 9–13 July 1990, Athens, Greece, page 127 et seq., and "Comparison of Methods for the Preparation of Acetoacetylated Coating Resins", J. S. Witzeman et al., *Journal of Coating Technology* 62, No. 789, 101 (1990)) and need not be further detailed here.

Preferably, polyacetoacetates used in the current invention are partial or complete acetoacetylation products of (1) monomeric polyalcohols having 2 to 6 hydroxyl groups, (2) partial esters of polyalcohols with monocarboxylic acids (the carboxylic acids having 2 to 22 and preferably 5 to 18 carbon atoms), the partial esters having at least 2 unreacted hydroxyl groups, (3) polymeric condensates having at least 2 hydroxyl groups, suitable polymeric condensates being, for non-limiting example, polyesters, polyethers and/or polyurethanes (see, for example, *The Chemistry of Organic Film Formers*, D. H. Solomon, Robert E. Krieger Publishing Co., 1977) and (4) addition polymers containing at least two (2) hydroxyl groups.

Some examples of monomeric polyalcohols having 2 to 6 hydroxyl groups which can be conveniently converted into polyacetoacetates include ethylene glycol, diethylene glycol, 1,2-propanediol, 1,4-butanediol, 1,5-pentanediol, neopentyl glycol, 1,6-hexanediol, 2-ethyl-2-butyl-propanediol, 2-methylpropanediol, 3-methyl-1,5-pentanediol, di-ethylene glycol, triethylene glycol, 1,4-cyclohexyldimethanol, dipropylene glycol, trimethylolethane, trimethylolpropane, glycerol, di-trimethylolpropane, pentaerythritol and the like.

Suitable partial esters of polyalcohols with monocarboxylic acids containing 2 to 22, preferably 5 to 18 carbon atoms, the partial esters having at least 2 unreacted hydroxyl groups, include for example the reaction product of a triol, e.g. trimethylolpropane, with a monocarboxylic acid in a, for example, 1:1 molar ratio. Other suitable partial esters are the reaction products of a tetrol e.g. pentaerythritol, with a monocarboxylic acid in, for example, 1:1 or 1:2 molar ratio. Useful monocarboxylic acids are: acetic acid, hexanoic acid, 2-ethylhexanoic acid, nonaoic acid, 3,5,5-trimethylhexanoic acid, benzoic acid, oleic acid, linoleic acid, dehydrated castor oil fatty acid, and the like. It is well known that esterification of polyalcohols with monocarboxylic acids in a stoichiometric excess of the hydroxyl component generally yield a mixture of products with different degrees of esterification and having different hydroxyl functionalities. In addition to single alcohols and acids, mixtures of one or both reactants may also be used.

Usually monomeric polyalcohols like trimethylolpropane, di-trimethylolpropane, pentaerythritol and other alcohols with 3 or more hydroxyl groups are partially esterified, however, if desired, polymeric preformed polyalcohols such as polyester-, polyether- and polyurethane polyols, and addition polymers, all containing 2 or more hydroxyl groups can be partially esterified with monocarboxylic acids and used as polyacetoacetate precursors.

Partial monocarboxylic acid esters of polyepoxy compounds represent a further group of suitable precursors for polyacetoacetate.

Polyester polyols having at least 2 hydroxylgroups are suitable precursors for preparing polyacetoacetates. Usually the polyester polyols are made by the condensation of polyhydric alcohols and polycarboxylic acids or anhydrides, with or without the use of a monobasic acid, at temperatures at about 150° C. to about 260° C. and with a stoichiometric excess of the alcohol component. Suitable polyesters have a number average molecular weight of about 200 to about 5000, a hydroxyl number of about 50 to about 500 and a acid number of about 0 to about 50, preferably from 0 to about 20. Examples of polycarboxylic acids and anhydrides suitable for the preparation of polyester polyols include succinic acid, adipic acid, azaleic acid, terephthalic acid, 1,4-cyclohexanedicarboxylic acid, fumaric acid, maleic acid, maleic anhydride, hexahydrophthalic anhydride, trimellitic anhydride and the like. Useful polyhydric alcohols (also sometimes referred to as "polyalcohols"), are ethylene glycol, diethylene glycol, 1,2-propanediol, 1,4-butanediol, 1,5-pentanediol, 1,6-hexanediol, 1,4-cyclohexanedimethanol, 2-methyl-1,3-propanediol, neopentyl glycol, 2-ethyl-2-butylpropanediol, glycerol, trimethylolethane, trimethylolpropane, sorbitol, pentaerythritol, di-trimethylolpropane and other low molecular polyalcohols. Further classes of suitable polyalcohols for the production of polyesterpolyols are the reaction products of monomeric polyalcohols with lactones, for example epsilon-caprolacton, alkoxylated polyalcohols such as the reaction products of glycerol, trimethylolpropane, neopentylglycol, water, ethylene glycol, Bisphenol A and the like with alkylene oxides, for example ethylene oxide, propylene oxide and mixtures thereof. The polyalcohols may be replaced partially or completely by mono- or poly-epoxides e.g. the glycidyl ester of a C9–C11 branched aliphatic acid (available as Cardura® E10 from Shell) or diglycidyl ethers based on Bisphenol A. Polylactone polyesterpolyols are a next group of suitable precursors. These polyols are formed from the reaction of a lactone, e.g. epsilon caprolactone, and a polyalcohol, for example, those already mentioned above, such as ethylene glycol, trimethylolpropane, neopentyl glycol, and ethoxylated trimethylolpropane.

Polyurethanes with at least 2 hydroxyl groups are a further class of suitable polyacetoacetate precursors. Preparation of these polyurethanes usually involves the reaction of polyisocyanates with a stoichiometric excess of a monomeric or polymeric polyalcohols. The isocyanate component is selected from n-functional isocyanates wherein n is a number ranging from 2 to 5 preferably from 2 to 4 and especially from 3 to 4. The isocyanate component may include a single such n-functional isocyanate or combinations thereof.

As specific examples of suitable n-functional isocyanates may be mentioned, for example, diisocyanates such as 1,6-hexane diisocyanate (commercially available, for example, under the trade designation HMDI from Bayer), isophorone diisocyanate (commercially available, for example, under the trade designation IPDI from Huels), tetramethylxylene diisocyanate (commercially available, for example, under the trade designation m-TMXDI from Cytec), 2-methyl-1,5-pentane diisocyanate, 2,2,4-trimethyl-1,6-hexane diisocyanate, 1,12-dodecane diisocyanate and methylene bis(4-cyclohexyl isocyanate) (commercially available, for example, Desmodur® W from Bayer), and higher functional isocyanates such as a biuret of 1,6-hexane diisocyanate (commercially available, for example, as Desmodur® N from Bayer), an isocyanurate of 1,6-hexane diisocyanate (commercially available, for example, as Desmodur® N-3390 from Bayer), an isocyanurate of isophorone diisocyanate (commercially available, for example, as Desmodur® Z-4370 from Bayer), a reaction product of tetramethylxylene diisocyanate and trimethylol propane (commercially available, for example, as Cythane® 3160 from Cytec), and a reaction product of one mole of trimethylol propane and 3 moles of toluene diisocyante (commercially available, for example, as Desmodur® L from Bayer).

Polyether polyols having at least 2 hydroxyl groups represent a further useful group of precursors for polyacetoacetates. Poly(oxyalkylene)diols, triols and tetrols are generally preferred. Usually this type of polyol is made from the reaction of alkylene oxides wherein the alkylene group contains 2–8 carbon atoms with monomeric polyalcohols, for example, those already mentioned above, such as glycerol, trimethylolpropane, pentaerythritol, sorbitol and the like, or preformed polymeric polyalcohols containing 2–6 hydroxyl groups such as polyester and polylactonepolyols. The reaction products of polyepoxides with monoalcohols and/or polyalcohols, preferably having 2–6 hydroxyl groups can also be used as polyacetoacetate precursors.

Suitable polyalcohols for the preparation of polyurethane polyols are for example the monomeric types already mentioned above, such as ethylene glycol, neopentyl glycol, 6-hexanediol, 1,2-propanediol, diethylene glycol, 2-ethyl-2-butyl-1,3-propane diol, trimethylol propane, glycerol, ditrimethylol propane, pentaerythritol and the like. Other suitable polyalcohols are partial esters from polyalcohols with monocarboxylic acids. Further usable polyalcohols include for example polyesterpolyols and polyetherpolyols, preferably containing 2–6 hydroxylgroups. Addition polyols having 2–6 hydroxyl may also be employed. The preparation of polyurethane polyols is well-known in the art.

Addition polymers having at least 2 hydroxyl groups are a very useful class of precursors for polyacetoacetates. Usually these hydroxyl-functional compounds are prepared by radical polymerization of ethylenically unsaturated monomers having one or more hydroxyl groups, generally in the presence of one or more ethylenically unsaturated comonomers which do not contain hydroxyl groups. A preferred group of hydroxyl-functional monomers are the hydroxyalkyl acrylates and hydroxyalkyl methacrylates. Representative monomers include: 2-hydroxyethyl acrylate, 2-hydroxyethyl methacrylate, 2-hydoxypropyl methacrylate, 2-hydroxyethyl acrylate, 4-hydroxybutyl acrylate and the like. Other useful hydroxy-functional monomers include the reaction product from methacrylic acid or acrylic acid with a monoepoxide, for example the glycidylether of a C9–C11 branched aliphatic acid, ethoxylated and propoxylated hydroxy-alkyl(meth)acrylates, allyl alcohol, and reaction products of hydroxyalkyl(meth) acrylates with lactones such as epsilon-caprolactone.

Suitable non-hydroxyl-functional ethylenically unsaturated comonomers are, for example, the acrylic or methacrylic esters of monoalcohol having 1–18 carbon such as ethyl(meth)acrylate, butyl(meth)acrylate, methyl(meth) acrylate, 2-ethyl-hexylacrylate and the like. Examples of other copolymerizable monomers include, for example, methacrylic acid, acrylic acid, glycidyl methacrylate, styrene, vinyl toluene, dibutyl maleate, vinyl acetate, vinyl versatate, allylglycidyl ether, itaconic acid, maleic acid and the like. A preferred number average molecular weight for addition polyols is about 500 to about 5000. An hydroxyl number of about 50 to 300 is preferred for the addition polyol. A preferred acid number is about 0 to 50.

An alternative and very convenient method for the preparation of acetoacetate functional addition polymers consists of (co)polymering one or more acetoacetate functional ethylenically unsaturated monomers. Preferred acetoacetate functional monomers are the acetoacetic acid esters of hydroxyalkyl (meth)acrylates such as 2-(acetoacetoxy)ethyl methacrylate, 2-(acetoacetoxy)ethyl acrylate, 2-(acetoacetoxy)propyl methacrylate, 2-(acetoacetoxy) propyl acrylate, 4-(acetoacetoxy)butyl acrylate and the like, allyl acetoacetate and the acetoacetic acid ester of the reaction product of a hydroxyalkyl (meth)acrylate with a lactone, or the acetoacetic acid ester of the reaction product of (meth)acrylic acid or a hydroxyalkyl (meth)acrylate with an alkylene oxide. Usually the acetoacetate functional monomers are copolymerized with non-acetoacetate functional monomers such as alkyl (meth)acrylates, the alkyl group having 1 to 18 carbon atoms, hydroxyalkyl (meth) acrylates, styrene, acrylic acid, methacrylic acid, maleic anhydride, dibutyl fumarate, acrylonitrile, acrylamide, vinyl toluene or other ethylenically unsaturated monomers. "(Meth)acrylate" is a shorthand indication of both acrylate and methacrylate.

All above-described polyalcohols are easily acetoacetylated by transesterification with alkyl acetoacetates of which the lower alkyl acetoacetates, having alkyl groups with 1 to 5 carbon atoms, are preferred such as methyl-, ethyl- or t-butyl acetoacetate. Another preferred method of acetoacetylation consists of reacting any of the mentioned polyalcohols with diketene. Both methods are suitable for partial or complete conversion of the hydroxyl groups into acetoacetate groups.

Preparation of polyacetoacetates are well known in the art and may be found, for example, in the above mentioned paper by Witzman et al.

The polyacetoacetates of the current invention have a number average molecular weight (Mn) less than 1000.

Preferably, the polyacetoacetates used in the current invention have a number average molecular weight above 200 and less than 1000 and more preferably, about 250 to about 750, and even more preferably about 250 to about 500.

The polyacetoacetates of this invention are acetoacetate-functional compounds which may be crosslinked via their acetoacetate groups. Crosslinkers for these acetoacetate-functional compounds of the current invention are well-known. Such crosslinkers are compounds having one or more groups capable of crosslinking with acetoacetate groups. For some examples, see U.S. Pat. No. 3,668,183, EP-A-199087 and EP-A-240083.

As some examples of crosslinkers for polyacetoacetates herein described may be mentioned the following general classes of compounds and their derivatives and modifications: polyfunctional amines, ketimines, aldimines, acryloyl and methacryloyl-functional polymers, copolymers and mixtures thereof.

Preferred crosslinkers are blocked primary amino group-containing compounds comprising the condensation product of (i) an aldehyde or a ketone and (ii) a polyamine having 2 to 6 (preferably 2 to 4) primary amino groups and a molecular weight of about 60 to about 1500, most preferably about 60 to about 1000. Depending on the ultimately desired coating characteristics, the ratio of acetoacetate groups in the polyacetoacetate group to blocked primary amino groups can be varied. The preferred ratio of acetoacetate groups in the polyacetoacetate to blocked primary amino groups is greater than 1, preferably between about 1.1 and about 2, more preferably between about 1.15 and about 1.5. Such blocked primary amino group-containing compounds are well known in the art from, for non-limiting example, EP-A-199087, EP-A-240083, U.S. Pat. Nos. 5,214,086, 4,504,630, 4,503,174, 4,251,597, WO-A-94/21738 and U.S. Pat. No. 3,975,251.

Preferred blocking agents are ketones and aldehydes having 3–10 carbon atoms and more preferably having 3–8 carbon atoms. Examples of suitable blocking agents include acetone, methylethylketone, methyl isobutyl ketone, diethylketone, methylacryl ketone, ethylamylketone, isobutyraldehyde, hexanaldehyde, heptanaldehyde, pentanone, cyclohexanone, isophorone, hydroxycitronellal and decanone.

Blocked primary amino group-containing compounds preferred for use in the current invention include, for example, the ketimines and aldimines prepared from the reaction of a ketone or aldehyde with aliphatic, cycloaliphatic or arylaliphatic amines containing 2 or more, preferably 2 to 4, primary amine groups and from 2 to 200 carbon atoms. Examples of suitable amines include: ethylenediamine, propylenediamine, butylenediamine, pentamethylenediamine, hexamethylenediamine, decamethylenediamine, 4,7-dioxadecane-1,10-diamine, dodecamethylenediamine, 4,9-dioxadodecane-1,12-diamine, 7-methyl-4,10-dioxatridecane-1,13-diamine, 1,2-diaminodicyclohexane, 1,4-diaminocyclohexane, 4,4'-diaminodicyclohexyl methane, isophorone diamine, bis(3-methyl-4-aminocyclohexyl)methane, 2,2-bis(4-aminocyclohexyl)propane, nitrile tris(ethane) amine, bis(3-aminopropyl) methylamine, 2-amino-1-(methylamino) propane, 3-amino-1-(cyclohexylamino)propane, N-(2-hydroxyethyl)ethylene diamine, 1,4-xylylenediamine and 4-aminomethyl, 1,8-octanediamine.

A particularly preferred group of polyamines that are useful in the practice of the present invention can be represented by the following structural formula:

where the groups R and R' can be the same or different and represent an alkylene group containing from 2 to 6 and preferably from 2 to 4 carbon atoms and n is a number from 1 to 6 and preferably from 1 to 3. Included in the definition of alkylene group are cycloalkylene groups and alkylene groups containing an ether-oxygen atom. Examples of representative polyalkylene polyamines include diethylenetriamine, dipropylenetriamine and dibutylenetriamine. These polyamines have two primary amino groups and one secondary amino group.

Also preferred as crosslinkers for polyacetoacetates are the ketimines and aldimines obtained from the adduct reaction of a partially ketone- or aldehyde-blocked polyamine with a mono- or polyfunctional epoxy, isocyanate, maleinate, fumarate, acryloyl or methacryloyl compound whereby the reacting components are chosen in such a way that the adduct contains at least 2 imine groups.

Preferred polyamines are the above-mentioned amines of the structural formula $H_2N-(R'-NH)_n-R-NH_2$ wherein n, R and R' are as described above. Other preferred polyamines for the formation of adducts have the structure $R-NH-R'-NH_2$ wherein R is an alkyl or alkenyl group containing up to 20 carbon atoms and R' is an alkylene group containing 2–12 carbon atoms.

As examples of preferred epoxy compounds may be mentioned the di- or polyglycidylethers of (cyclo)aliphatic or aromatic hydroxyl compounds such as ethylene glycol, butanediol, polypropyleneglycol, Bisphenol-A, Bisphenol-F; hydrogenated Bisphenol-A, hydrogenated Bisphenol-F, phenol formaldehyde novolaks, etc. Other suitable epoxy compounds are monofunctional glycidylethers and glycidylesters such a phenylglycidylether, 2-ethylhexylglycidylether, the glycidylester of a C9–C11 branched aliphatic acid (available under the tradename Cardura E10 from Shell) and the like. Diglycidylesters of dicarboxylic acids containing for instance 6–24 carbon atoms can also be conveniently used. Further examples of suitable epoxy compounds are disclosed in EP 0 199 087, U.S. Pat. No. 5,288,802, and EP 240 083. The epoxy resins are known to a skilled person and need no further description.

Examples of suitable isocyanate compounds for the preparation of adducts with partially blocked polyamines include aliphatic, cycloaliphatic or aromatic mono-, di-, tri- or tetraisocyanates and polyisocyanate prepolymers thereof. Preferred isocyanates include 1,6-hexane diisocyanate, isophorone diisocyanate, tetramethylxylene diisocyanate, 2,2,4-trimethyl-1,6-hexane diisocyanate, 1,12-dodecane diisocyanate, methylene bis(4-cyclohexyl isocyanate), 2,4- and 2,6-toluene diisocyanate, 4,4-diphenylmethane diisocyanate, xylene diisocyanate, the biuret of 1,6-hexane diisocyanate, the isocyanurate of 1,6-hexane diisocyanate, the isocyanurate of isophorone diisocyanate, the uretdione of 1,6-hexane diisocyanate, etc. Other preferred isocyanates are the reaction products of diols or triols with a stoichiometric excess of di- or triisocyanate, for example, the reaction product of isophorone diisocyanate or 1,6-hexane diisocyanate with a diol such as ethylene glycol, 1,2-propanediol and the like or with a triol such as trimethylol propane and the reaction product of tetramethylxylene diisocyante with trimethylol propane. Additional suitable isocyanates are disclosed in EP-A- 199 087 and EP-A-139 513.

Examples of suitable acryloyl or methacryloyl include the (meth)acrylic acid esters of mono-, di-, tri- or polyvalent hydroxyl compounds such as butanol, 2-ethylhexanol, ethylene glycol, neopentylglycol, 1,6-hexanediol, trimethylolpropane, ethoxylated trimethylolpropane, ditrimethylolpropane, pentaerythritol, diethylene glycol, polypropylene glycol, polyesterdiols and -triols, and polyurethanediols and -triols. The reaction products of (meth) arylic acid with epoxy compounds e.g. the glycidylether of Bisphenol A are also suitable for adduct formation with partially blocked polyamines.

A further group of suitable reaction partners are maleate and fumarate compounds such as diethyl maleate, dibutyl fumarate and unsaturated polyesters containing one or more maleate or fumarate groups. Suitable unsaturated polyesters include, for example, the polycondensation product of maleic anhydride with neopentyl glycol. The unsaturated polyester resins are well-known in the art and need no further description for skilled persons.

Particularly suitable ketimes are obtained by the reaction of a diisocyanate (such as hexamethylene diisocyanate) with a diketimine obtained from one mole dialkylene triamine (such as dipropylene triamine) and 2 moles ketone, as detailed in EP-A-199087 and EP-A-240083.

In addition to the polyacetoacetate and crosslinker, the binder may comprise additional binder components such as isocyanates, epoxides, and oxazolidines.

The organosilanes useful in the current invention are of the following general formula:

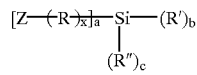

wherein

Z is an amino group, an amino-containing group, an epoxy group, an epoxy-containing group, a mercapto group, a mercapto-containing group, a vinyl group, a vinyl-containing group, an isocyanate group, an isocyanate-containing group, an ureido group, an ureido-containing group, an imidazole group or an imidazole-containing group, R is an aliphatic, alicyclic or aromatic group, R' is an alkoxy group or alkoxyalkoxy group, R" is an alkyl group having 1 to about 8 carbon atoms, x is 0 to about 20, a is 0 to 3, preferably 0 to 2, b is 1 to 4, preferably 1 to 3, c is 0 to 3, preferably 0 to 2, and the sum of a+b+c is 4.

Typically, R is an alkylene group, e.g. methylene.

Typically R' is a lower alkoxy or alkoxyalkoxy, e.g. ethoxy, propoxy, isopropoxy, ethoxyethoxy, etc. and, most commonly, methoxy.

As preferred organosilanes may be mentioned $NH_2(CH_2)_3Si(OCH_3)_3$, $NH_2CH_2NH(CH_2)_3Si(OCH_3)_3$, $CH_2(O)CH_2CH_2O(CH_2)_3Si(OCH_3)_3$, $SH(CH_2)_3Si(OCH_3)_3$, and mixtures thereof.

Some organosilanes useful in the current invention are listed below.

the binder components. Depending on the organosilane used, it may be present as either a "free" additive (that is, unreacted) or it may be present in the form of a reaction product with another component of the coating composition.

The coating compositions of this invention may also contain a pigment component. The pigment component of this invention may be any of the generally well-known pigments or mixtures thereof used in coating formulations, as reported, e.g., in *Pigment Handbook*, T. C. Patton, Ed., Wiley-Interscience, New York, 1973. The coating composi-

| Aminosilanes | |
|---|---|
| $H_2N(CH_2)_3Si(OC_2H_5)_3$ | 3-Aminopropyl-triethoxysilane |
| $H_2N(CH_2)_3Si(CH_3)(OC_2H_5)_2$ | 3-Aminopropyl-methyl-diethoxysilane |
| $H_2N(CH_2)_3Si(OCH_3)_3$ | 3-Aminopropyl-trimethoxysilane |
| $H_2N(CH_2)_3Si[(OC_2H_4)_2OCH_3]_3$ | 3-Aminopropyl-tris(2-methoxyethoxyethoxy)silane |
| $H_3C-NH(CH_2)_3Si(OCH_3)_3$ | N-Methyl-3-aminopropyl-trimethoxy-silane |
| $H_2N(CH_2)_2NH(CH_2)_3Si(OCH_3)_3$ | N-Aminoethyl-3-aminopropyl-trimethoxy-silane |
| $H_2N(CH_2)_2NH(CH_2)_3Si(CH_3)(OCH_3)_2$ | N-Aminoethyl-3-aminopropyl-methyl-dimethoxysilane |
| $(CH_3O)_3-Si(CH_2)_3NH(CH_2)_3Si(OCH_3)_3$ | N,N-Bis(trimethoxysilylpropyl)amine |
| Mercaptosilanes | |
| $HS(CH_2)_3Si(OC_2H_5)_3$ | 3-Mercaptopropyl-triethoxysilane |
| $HS(CH_2)_3Si(OCH_3)_3$ | 3-Mercaptopropyl-trimethoxysilane |
| $HS(CH_2)_3Si(CH_3)(OCH_3)_2$ | 3-Mercaptopropyl-methyl-dimethoxysilane |
| Vinylsilane | |
| $H_2C=C(CH_3(COO(CH_2)_3Si(OCH_3)_3$ | 3-Methacryloxypropyl-trimethoxysilane |
| $CH_2=CHSi(OC_2H_5)_3$ | Vinyltriethoxysilane |
| $CH_2=CHSi(OCH_3)_3$ | Vinyltrimethoxysilane |
| $CH_2=CHSi(OC_2H_4OCH_3)_3$ | Vinyl-tris(2-methoxy-ethoxy)silane |
| Epoxysilanes | |
| 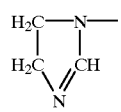 $-H_2C-CH-CH_2O(CH_2)_3Si(OCH_3)_3$ | 3-Glycidyloxypropyl-trimethoxysilane |
| 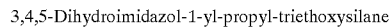 | 2-(3,4-Epoxycyclohexyl)ethyltrimethoxysilane |
| Ureidosilane | |
| $H_2N-CO-NH(CH_2)_3Si(OC_2H_5)_3$ | 3-Ureidopropyl-triethoxysilane |
| Imidazolesilane | |
| 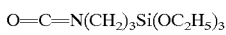 | 3,4,5-Dihydroimidazol-1-yl-propyl-triethoxysilane |
| Isocyanatosilane | |
| $O=C=N(CH_2)_3Si(OC_2H_5)_3$ | 3-Isocyanatopropyltriethoxysilane |

A particularly effective "adhesion-enhancing amount" of organosilanes is about 1 to about 10 weight % based on binder solids, preferably about 1.5 to about 5 weight %.

The coating compositions of the current invention are typically, though not necessarily, formulated as well-known "two-pack" systems. Thus, in general the organosilane may be placed with either the crosslinker or with the polyacetoacetate. Further, the organosilane may be added as a "third component", that is, it may be added independently rather than with the crosslinker or polyacetoacetate. Independent addition of the organosilane is particularly desirable when the organosilane is capable of crosslinking with one of tion disclosed herein has been found to be particularly useful for pigment components which are substantially chromate-free. Non-limiting examples of such substantially chromate-free pigments are barium metaborate, zinc phosphate, aluminum triphosphate and mixtures thereof. Preferably, the pigment component, if employed, is present in a pigment volume concentration of about 10 to about 40.

Coating compositions of the instant invention have been found to be particularly useful as primer coats, especially for aluminum substrates. Typically, when the current coating compositions are formulated for use as such primer coats, the above-described substantially chromate-free pigments are employed.

The coating composition generally contains an organic solvent which is commonly applied, for instance, in the industrial preparation of paint, such as aliphatic or aromatic hydrocarbons, esters, ethers, alcohols, ketones and ether acetates. However, the amount of solvent is typically lower than what is commonly required in that the current invention may be formulated as a "high solids" (low solvent) coating composition. Such compositions are also referred to a "low VOC" coating compositions. Current "high solids" formulations have a VOC preferably below 420 g/l and more preferably below 350 g/l. "VOC" refers to the "volatile organic content", which is normally expressed as grams organic volatiles per liter organic component.

The coating composition of the current invention may also contain other additives usual for such formulations. A particularly preferred additive is a water scavenger, such as a molecular sieve. Other typical additives may be, for non-limiting example, dispersing agents, for instance, soya lecithin; fillers; reactive diluents; plasticizers; levelling agents, for instance, acrylate oligomers; anti-foaming agents, for instance, silicone oil; metal salts of organic acids, such as cobalt of ethyl hexanoate, dibutyl tin dilaurate; chelating agents; rheology control agents, for instance, bentonites, pyrolized silica, hydrogenated castor oil derivatives and adducts of a di- or truisocyanate and a monoamine; catalysts, such as phosphoric acid, phosphoric esters, and carboxylic acids; antioxidants, such as substituted phenols; and UV stabilizers, such as, benzophenones, triazoles, benzoates and hindered bipiridylamines.

The coating composition may be applied to the substrate in any suitable manner, such as by roller coating, spraying, brushing, flow coating, or dipping. It is preferred that the composition is applied by spraying.

Suitable substrates include plastic and metals, such as iron, steel, galvanized steel and, as earlier mentioned, the preferred aluminium. Prior to applying a coating of the current invention, the surface may be prepared in conventional ways, for example, cleaning (with, for example, solvent or a water based alkaline cleaner), mechanically treating (for example, abrasion) and/or conversion coating (phosphorizing, chromating or anodizing).

A temperature above ambient is not necessary to dry and cure the coating compositions disclosed herein; however, heat may be applied. Thus, the full range of temperatures, from, for example, about 5° C. to about 100° C. can be used to cure and/or dry the coating compositions of this invention.

The current invention is further disclosed and explained with reference to the following representative, though non-limiting, examples.

EXAMPLES

The adhesion and corrosion resistance of coating compositions according to the current invention were tested as detailed below.

Preparation of Polyacetoacetates

The polyacetoacetates used in the following examples were prepared by transesterification of the polyols with ethyl acetoacetate or t-butyl acetoacetate according to the methods described by Witzeman J. S. in *Journal of Coating Technology* 62, No. 789, 101 (1990). The acetoacetate of Test Nos. 5–26 was prepared by acetoacetylation of a precondensate from ditrimethylolpropane (1 mole) and isononanoic acid (0.6 mole).

Preparation of Ketimine Resin

The ketimine resin used in the following examples is the adduct of 1,6-hexane diisocyanate (1 mole) with 2 moles of the diketimine from dipropylenetriamine and methyl isobutyl ketone. The ketimine resin was prepared according to the method described in EP-A-240083, and was used in the form of an 85% solution in a mixture of xylene and methyl isobutyl ketone.

Test Nos.1–4

Test Nos. 1–4 were conducted as described below. Results are reported in Table 1.

Experimental Method: Test Nos. 1–4

The primers for Test Nos. 1 and 3 have a polyacetoacetate/crosslinker ratio of 1 and are thus comparative.

The primers were applied with a spray gun to a dry-layer thickness of about 20 to about 30 µm.

Table 1 reports the results of the following adhesion tests. The primers of Test Nos. 1–4 were applied to Alclad 2024T3 substrates which had been cleaned with Sikkens® B2, a waterbased cleaner for coated and uncoated surfaces available from AD Aerospace Finishes VoF, Sassenheim, the Netherlands. The coated substrates were aged for one week after which a "modified" DIN 53151 cross-hatch method was used to test initial adhesion, adhesion after water immersion and adhesion after immersion in hydraulic oil. In conventional cross-hatch adhesions tests, several grids are made wherein each grid has equal spacing in both the horizontal and vertical directions, for example, in one grid the spacing between the cuts is 0.1 mm in both the horizontal and vertical directions, in another grid the spacing is 0.2 mm, in another the spacing is 0.3 mm, etc. As a modification, the adhesion tests reported here were performed by using one grid wherein in both the horizontal and vertical directions the spacing between cuts was increased by 0.1 mm over the next previous cut; that is, the spacing between the first two cuts was 0.1 mm, between the second and third cuts was 0.2 mm, between the third and fourth cuts 0.3 mm, etc. until a spacing of 1.1 mm was acheived.

Primer Formulation: Test Nos. 1–4

| | Parts by weight | | | |
|---|---|---|---|---|
| Component | Test No. 1 | Test No. 2 | Test No. 3 | Test No. 4 |
| A. 1.6-hexane-diol-di-acetoacetate | — | — | 262 | 288 |
| B. Trimethylolpropane-triacetoacetate | 253 | 279 | | |
| C. TiO$_2$[1] | 202 | 202 | 202 | 202 |
| D. Pigment[2] | 12 | 12 | 12 | 12 |
| E. Molecular sieve[3] | 16 | 16 | 16 | 16 |
| F. Ketimine Resin[4] | 395 | 349 | 380 | 334 |
| G. Butylacetate | 122 | 142 | 128 | 148 |
| | 1000 | 1000 | 1000 | 1000 |

[1]Kronos 2310 available from Kronos Inc.
[2]K-White 84 aluminum triphosphate available from Tayca Corp.
[3]Baylith L available from Bayer
[4]Hexamethylene diisocyanate/dipropylene triamine/methyl isobutyl ketone (respectively 1 mole/2 moles/4 moles).

Test Nos. 5–26

In Test Nos. 5–26, four (4) different silanes were added, in separate tests, to the primer formulation described below. Various silane concentration levels as well as the manner of adding the silane to the coating composition (primer) were also tested. Results are reported in Tables 2 and 3.

Experimental Method: Test Nos. 5–26

In Test Nos. 5–12, the silane indicated in Table 2 was premixed with trimethylol propane-triacetoacetate to form the Adduct. Components A and B were separately prepared then mixed to form a primer.

In Test Nos. 13–22, the silane was not premixed. Rather, Component A and Component B were prepared. In preparing Component A, trimethylol propane-triacetoacetate and the relevant silane were separately added. Components A and B were mixed to form a primer.

The primers for Test Nos. 21 and 22 contain no silane and are thus comparative. They were prepared in the same manner as the primers for Test Nos. 5–20, omitting the silane.

In Test No. 23 the silane was added to Component B. In Test Nos. 24–26, Component B and the silane were each independently added to Component A.

In all Test Nos. 5–26 the primers were applied by spray gun to a dry-layer thickness of about 20 to 25 μm. At spraying viscosity (30–35 s ISO-cup 4) the VOC for the primers was 350 g/l.

Table 2 reports the results of the following adhesion tests. Variously aged primers (specifically one day, one week and one month after primer preparation) of Test Nos. 5–26 were applied to Alclad 2024T3 substrates which had been cleaned with Sikkens®B2. The coated substrates were aged for one week, after which the already-described modified DIN 53151 cross-hatch method was used to test both initial adhesion and wet adhesion after 2 weeks of water immersion. Test No. 23 was carried out in a similar fashion, except only wet adhesion of a one-day primer was tested. Test Nos. 24–26 were also carried out in the manner described for Test Nos. 5–26, except only one-day-aged primers were tested.

Table 3 reports the results of the following adhesion tests. The variously aged primers of Test Nos. 5–26 were applied to Alclad 2024T3 substrates which had been cleaned with Sikkens®B2 and a Scotch-Brite®pad. After one day the primers were sprayed over with the topcoat Aviox® Finishes available from AD Aerospace Finishes VoF, Sassenheim the Netherlands. The coated substrates were aged for one week, after which the already described modified DIN 53151 cross-hatch method was used to test both initial adhesion and wet adhesion after 2 weeks of water immersion and DIN 65472 was used to test filiform corrosion (FFC) resistance. Test No. 23 was carried ou in a manner consistent with Test Nos. 5–22 except the Alclad 2024T3 substrate was pretreated first with alkaline cleaning, then with alkaline etching and finally with citric acid pickling. Only testing indicated in Table 3 was performed. Test Nos. 24–26 were carried out in a manner consistent with Test Nos. 5–22 except the primers were sprayed with Areodur® C21/100 UVR available from AD Aerospace Finishes VoF, Sassenheim, the Netherlands. Only testing indicated in Table 3 was performed for Test Nos. 24–26.

In Tables 2 and 3, "Ratio PolyAc/Crosslinker" means the ratio of acetoacetate groups to groups capable of crosslinking with the acetoacetate groups.

| Primer Formulation: Test Nos. 5–22 | Parts by weight | |
|---|---|---|
| | 2% Silane | 5% Silane |
| Primer Component A | | |
| Millbase (see below) | 457 | 440 |
| 2,2-ethylbutylpropane diol 1,3- diacetoacetate | 145 | 127 |
| Adduct (see below) | 23 | 56 |
| Butylacetate | 75 | 77 |
| | 700 | 700 |
| Primer Component B | | |
| Ketimine Resin[1] | 238 | 233.5 |
| Butylacetate | 62 | 66.5 |
| | 300 | 300 |

| | Parts by weight |
|---|---|
| Millbase: Test Nos. 5–22 | |
| Ditrimethylol propane-3.4 acetoacetate/0.6 Isononaote | 250 |
| Dispersant[2] | 15 |
| Butylacetate | 95 |
| TiO2[3] | 130 |
| Corrosion resistant pigment[4] | 430 |
| Pigment[5] | 35 |
| Molecular sieve[6] | 45 |
| | 1000 |
| Adduct: Test Nos. 5–22 | |
| Trimethylol propane-triacetoacetate | 65 |
| Silane | 35 |
| | 100 |

A. Aminosilane (Dynosilan ® AMEO-T): $NH_2(CH_2)_3Si(OCH_3)_3$
B. Diaminosilane (Dynosilan ® DAMO): $NH_2CH_2NH(CH_2)_3Si(OCH_3)_3$
C. Epoxysilane: $CH_2(O)CHCH_2O(CH_2)_3Si(OCH_3)_3$
D. Mercaptosilane: $SH(CH_2)_3Si(OCH_3)_3$
Primer Formulation: Test No. 23
Primer Component A

| | |
|---|---|
| Millbase (see below) | 586.79 |
| 1,5 pentanediol diacetoacetate | 34.68 |
| Oxazolidine Resin (see below) | 12.57 |
| Silicone oil[7] | 3.08 |
| Primer Component B | |
| Ketimine Resin[1] | 243.22 |
| Butylacetate | 104.49 |
| Silane C:Epoxysilane: $CH_2(O)CHCH_2O(CH_2)_3Si(OCH_3)_3$ | 15.17 |
| Millbase: Test No. 23 | |
| 1,5 pentanediol diacetoacetate | 158.68 |
| Dispersant[2] | 17.34 |
| Butylacetate | 35.98 |
| $TiO_2$[3] | 100.67 |
| Corrosion resistant pigment[8] | 153.65 |
| Pigment[9] | 49.16 |
| Molecular Sieve[6] | 60.70 |
| Rheology modifier[10] | 10.41 |

Oxazolidine Resin

The oxazolidine resin is a copolymer of butylacrylate, hydroxypropyl acrylate and 2(2'2-pentamethylene-oxazolidine-3'-4b)ethyl methacrylate.

|  | Parts by weight | | |
|---|---|---|---|
| Primer Formulation: Test Nos. 24–26 | 18 | 19 | 20 |
| Primer Component A | | | |
| Millbase (see below) | 137.0 | 137.0 | 137.0 |
| Trimethyol propane | 9.7 | 7.5 | 5.5 |
| Triacetoacetate 1,5 pentanediol-diacetoacetate | 24.7 | 22.5 | 20.5 |
| Primer Component B | | | |
| Ketimine Resin[1] | 61.0 | 70.35 | 77.55 |
| Silane | | | |
| Silane C:Expoxysilane: $CH_2(O)CHCH_2O(CH_2)_3Si(OCH_3)_3$ | 4.0 | 4.0 | 4.0 |

| Millbase: Test Nos. 24–26 | |
|---|---|
| Trimethylol propane triacetoacetate | 150 |
| Dispersant[2] | 20 |
| Butylacetate | 160 |
| $TiO_2$[3] | 850 |
| Pigment[5] | 90 |
| Molecular Sieve | 100 |
| | 1370 |

Notes for Test Nos. 5–26
[1]Hexamethylene diisocyanate/dipropylene triamine/methyl isobutyl ketone (respectively 1 mole/2 moles/4 moles)
[2]Disperbyk 163, a polyurethane-based pigment dispersing agent available from Byk Chemie.
[3]Kronos 2310 available from Kronos Inc.
[4]Busan 11M2 barium metaborate available from Buckman Laboratories.
[5]K-White 84 aluminum triphosphate available from Tayca Corporation.
[6]Baylith L available from Bayer.
[7]Byk-344 silicone oil available from Byk Chemie.
[8]Wollastcup 10ES, a calcium silicate available from Nyco.
[9]SZP-391 strontium zinc phosphorsilicate available from Haloa.
[10]Y-25, a rheology modifier available from Rohland-Süd Chemie.

TABLE 1

| | Adhesion | | | |
|---|---|---|---|---|
| Test No. | 1 | 2 | 3 | 4 |
| Polyacetoacetate/crosslinker ratio | 1 | 1.25 | 1 | 1.25 |
| VOC in g/l at 32" ISO cup 4 | 380 | 360 | 370 | 350 |
| Geltime in hours | 2 | 2 | 4 | 4.5 |
| Potlife in hours | .5 | .5 | 1 | .5 |
| Adhesion: Initial | >1.1mm | >1.1 mm | >1.1mm | >1.1 mm |
| Adhesion: After water immersion (1 week) | >1.1 mm | 0.8 mm | >1.1 mm | 0.3 mm |
| Adhesion: After hydraulic oil immersion (1 day at 95° C.) | >1.1 mm | 0.4 mm | >1.1 mm | 0.1 mm |

TABLE 2

| | | | | Adhesion | | | | | |
|---|---|---|---|---|---|---|---|---|---|
| | | Ratio PolyAc/ | | | | Adhesion in mm* | | | |
| Test No. | Silane conc. | Cross-linker | Si-lane** | Initial | | | After water-immersion | | |
| | | | | 1 day | 1 week | 1 month | 1 day | 1 week | 1 month |
| 5 | 2% | 1.25 | A | 1.2 | 1.2 | 1.2 | 1.5 | 2 | 2 |
| 6 | 2% | 1.25 | B | Gelation of the Adduct+ | | | | | |
| 7 | 2% | 1.25 | C | 0.4 | 0.3 | 0.3 | 0.4 | 0.5 | 0.4 |
| 8 | 2% | 1.25 | D | 0.8 | 0.9 | 0.9 | 1.5 | 0.5 | 1.5 |
| 9 | 5% | 1.25 | A | 1.5 | 1.5 | 1.5 | 0.6 | 1.2 | 1.2 |
| 10 | 5% | 1.25 | B | Gelation of the Adduct+ | | | | | |
| 11 | 5% | 1.25 | C | 0.4 | 0.8 | 0.8 | 0.4 | 0.3 | 0.4 |
| 12 | 5% | 1.25 | D | 1.2 | 1.5 | 1.5 | 1.5 | 2.0 | 2.5 |
| 13 | 2% | 1.25 | A | 1.5 | 1.5 | 1.5 | 1.5 | 2.5 | 1.5 |
| 14 | 2% | 1.25 | B | 0.8 | 1.5 | 1.5 | 0.2 | TD | 1.5 |
| 15 | 2% | 1.25 | C | 0.7 | 0.9 | 0.8 | 0.3 | 0.2 | 0.3 |
| 16 | 2% | 1.25 | D | 1.5 | 1.2 | 1.5 | 2.0 | 2.5 | 2.5 |
| 17 | 5% | 1.25 | A | 1.5 | 1.5 | 1.5 | 0.4 | 2.5 | 2.5 |
| 18 | 5% | 1.25 | B | 0.8 | 1.5 | 1.5 | 0.3 | TD | 2.5 |
| 19 | 5% | 1.25 | C | 1.0 | 1.1 | 1.1 | 1.5 | 0.2 | 0.3 |
| 20 | 5% | 1.25 | D | 1.5 | 1.5 | 1.5 | 2.5 | 1.5 | 1.5 |
| 21 | 0% | 1.25 | None | 2.5 | 2.5 | 2.5 | TD | TD | TD |
| 22 | 0% | 1.25 | None | 2.5 | 2.5 | 2.5 | TD | TD | TD |
| 23 | 1.52 | 1.25 | C | <1 | — | — | <1 | — | — |
| 24 | 1.53 | 1.25 | C | 0.1 | — | — | 0.2 | — | — |
| 25 | 1.53 | 1.00 | C | 0.2 | — | — | 0.2 | — | — |
| 26 | 1.53 | 0.83 | C | 0.2 | — | — | 0.2 | — | — |

*Below 1.2 indicates partial detachment up to mentioned value.
1.2 indicates detachment up to 1.1. × 1.1. mm.
1.5 indicates detachment up to 1.1 × 1.1 mm + up to 50% detachment below the tape.
2.5 indicates detachment up to 1.1 × 1.1 mm + 100% detachment below the tape.
TD indicates total detachment without tape.
**A, B, C and D defined under "adduct" above.
+Crosslinked due to diamino functionality

TABLE 3

Adhesion and FFC resistance

| Test No. | Adhesion in mm* | | | | | | Filiform corrosion resistance** | | | |
|---|---|---|---|---|---|---|---|---|---|---|
| | Initial | | | After water-immersion | | | Horizontal | | Vertical | |
| | 1 day | 1 week | 1 month | 1 day | 1 week | 1 month | CS | L | CS | L |
| 5 | 0.3 | 0.2 | 0.3 | 0.7 | 2.0 | 2.0 | 53 | 4.7 | 37 | 2.9 |
| 6 | | | | Gelation of the Adduct+ | | | | | | |
| 7 | 0.2 | 0.2 | 0.2 | 0.4 | 0.5 | 0.4 | 91 | 5.7 | 50 | 3.9 |
| 8 | 0.4 | 0.2 | 0.5 | 1.2 | 0.5 | 1.0 | 90 | 4.9 | 56 | 3.4 |
| 9 | 0.4 | 0.2 | 0.3 | 1.0 | 1.2 | 1.2 | 35 | 3.8 | 33 | 2.7 |
| 10 | | | | Gelation of the Adduct+ | | | | | | |
| 11 | 0.2 | 0.3 | 0.3 | 0.4 | 0.3 | 0.3 | 68 | 5.4 | 41 | 4.1 |
| 12 | 0.6 | 0.3 | 0.6 | 1.5 | 2.0 | 2.0 | 82 | 5.9 | 50 | 2.2 |
| 13 | 0.4 | 0.3 | 0.3 | 0.6 | 2.5 | 2.0 | 112 | 5.1 | 52 | 2.5 |
| 14 | 0.2 | 1.2 | 1.0 | 0.5 | TD | 2.5 | 87 | 4.3 | 63 | 3.0 |
| 15 | 0.2 | 0.2 | 0.2 | 0.5 | 0.2 | 0.3 | 55 | 2.9 | 37 | 2.2 |
| 15 | 0.4 | 0.2 | 0.5 | 0.6 | 2.5 | TD | 88 | 6.3 | 55 | 2.9 |
| 17 | 0.5 | 0.4 | 0.5 | 0.8 | 2.5 | 2.5 | 85 | 5.2 | 43 | 2.8 |
| 18 | 0.4 | 0.8 | 0.6 | 0.5 | TD | 2.5 | 65 | 4.1 | 44 | 2.3 |
| 19 | 0.4 | 0.3 | 0.3 | 0.6 | 0.2 | 0.3 | 109 | 8.6 | 43 | 2.1 |
| 20 | 0.4 | 0.2 | 0.5 | 1.2 | 1.2 | 1.5 | 104 | 8.2 | 41 | 2.1 |
| 21 | 1.2 | 1.5 | 1.5 | 1.5 | TD | TD | 140 | 7.8 | 81 | 3.0 |
| 22 | 1.2 | 1.5 | 1.5 | 1.5 | TD | TD | 127 | 5.3 | 65 | 3.1 |
| 23 | <1 | — | — | <1 | — | — | — | 2–3 | — | 2–3 |
| 24 | 0.2 | — | — | 0.1 | — | — | — | — | 84.4 | 3.0 |
| 25 | 0.2 | — | — | 0.2 | — | — | — | — | 70.5 | 2.8 |
| 26 | 0.1 | — | — | 0.1 | — | — | — | — | 68.5 | 3.3 |

*Same as for Table 2
**CS is "corroded surface" in mm$^2$
L is "length" (max.) of the filis in mm.

We claim:

1. A method of coating a substrate comprising coating a substrate with a coating composition which when cured has improved substrate-adhesion, said coating composition comprising (a) a polyacetoacetate having acetoacetate groups and having a number average molecular weight less than 1000

(b) a crosslinker for said polyacetoacetate, the crosslinker having groups capable of crosslinking with said acetoacetate groups, and wherein the ratio of acetoacetate groups to groups capable of crosslinking with said acetoacetate groups is about 1.15 to 2.

2. The method of claim 1 wherein the substrate is selected from aluminium, steel, galvanized steel, and plastic.

* * * * *